Oct. 20, 1959    E. KARIG    2,909,072
CONTROL MECHANISM FOR INFINITELY VARIABLE GEAR UNITS
Filed July 29, 1957    3 Sheets-Sheet 1

INVENTOR.
ERHARDT KARIG
BY
Bailey, Stephens & Huettig
ATTORNEYS

United States Patent Office 2,909,072
Patented Oct. 20, 1959

2,909,072

CONTROL MECHANISM FOR INFINITELY VARIABLE GEAR UNITS

Erhardt Karig, Bad Homburg vor der Hohe, Germany, assignor to Reimers-Getriebe K.G., Zurich, Switzerland, a firm Application July 29, 1957, Serial No. 674,721

Claims priority, application Switzerland August 9, 1956

9 Claims. (Cl. 74—230.17)

The present invention relates to an apparatus for automatically and uniformly distributing the load in a plurality of infinitely variable speed belt transmissions of equal construction which are connected to each other in parallel in order to transmit a multiple of the maximum output of the individual transmission units.

In such interconnected transmission units it has been found very difficult to maintain the respective adjusted transmission ratio of the individual transmission units exactly uniform in all of the transmission units. If the ratios of the individual transmission units do not accurately coincide with each other, not only the individual transmission units will be differently loaded but additional loads will also occur within the combined transmission units which are produced by the individual loads counteracting each other and which may amount to a multiple of the actual output transmitted by the transmission units. These counteracting loads may lead to an increased wear and a reduction in the efficiency of the transmission units, and possibly even to serious damage of the transmission units.

It is already known in the art that in interconnected transmission units a uniform load distribution between the individual transmission units may be insured by inserting differential gears between the shaft connections of the variable transmission units. However, in view of the large forces to be transmitted, the differential gears consisting of numerous parts must be made of very large dimensions and will thus require considerable space and be very expensive.

It is the principal object of the present invention to distribute the load uniformly upon the individual transmission units by applying very simple and much less expensive means than previously was required.

A further object of the invention is to connect several transmission units of equal construction to each other without requiring any involved or extensive changes in the construction of the individual transmission units as previously required by the insertion of differential gears between the individual transmission unit shafts because such differential gears had to run in oil baths and therefore required their own special housings or had to be mounted within the housing of the infinitely variable transmission unit.

For carrying out the above-mentioned object, the invention essentially consists in balancing the forces relative to each other which act upon the control rods of the individual transmission units and, if differential forces occur, in utilizing these forces to change the transmission ratio of the individual transmission units relative to each other independently of the respective adjusted ratio of all transmission units until a state of equilibrium of the forces which act upon the control rods and counteract each other will again be attained. These requirements necessitate transmission unit designs in which the control rods which are operated by an adjusting mechanism and serve to produce corresponding changes in the transmission ratio of the individual transmission units are acted upon by control forces which vary with a change responsive to the torque of the output shaft and the transmission ratio of the transmission unit.

When using transmission units of this type, the above-mentioned object of the invention may be attained by interconnecting the drive shafts as well as the driven shaft of the transmission units in such a manner that they will always drive at an equal speed and so that the control rods of the transmission units will be connected with each other not only by a common adjusting mechanism for producing an equal and symmetrical change in the transmission ratios of the transmission units, but also by a compensating rod through which the counteracting control forces will balance each other and whereby at an unequal load distribution the control rods will be made adjustable relative to each other in such a manner that a change in the transmission ratio of one transmission unit will always be compensated by an inverse change in the transmission ratio of another transmission unit.

The present invention is particularly, although by no means exclusively, applicable to infinitely variable transmission units with cone-pulley drives in which the power is transmitted from one pulley to the other preferably by means of a metallic belt or chain, and wherein the cone pulley on each transmission unit shaft consists of a conical disk which is rigidly secured to the shaft and another conical disk which is inclined in the opposite direction and movable axially along the shaft relative to the fixed disk, and in which the movable disk is subjected to a pressure in the axial direction toward the fixed disk.

In transmission units of this type, the present invention may be applied very advantageously by connecting the movable fulcrums of the control levers of two interconnected transmission units by means of a connecting rod which serves as a compensating rod, so that the control rods and the connecting rod together form a linkage system, sometimes also called a "swinging block linkage," which is pivotable about two normally fixed fulcrums which are spaced from each other at a distance which is determined by means of a single adjusting mechanism which is common to all transmission units. This system is designed so that, when by the operation of the common adjusting mechanism the distance between the two normally fixed fulcrums is changed, the transmission ratios of the transmission units will be changed equally and symmetrically, while upon a pivotal movement of the linkage system about the fixed fulcrums, the transmission ratios of the transmission units will be changed inversely to each other.

However, the present invention may not only be applied for interconnecting two infinitely variable transmission units so as to form a single unit, but also for interconnecting several groups of such two transmission units. If two such units are connected to each other in parallel, the invention further provides an articulated connection between each of the fixed fulcrums of the linkage system of one two-transmission unit with a corresponding fixed fulcrum of the linkage system of another two-transmission unit. Each articulated connection consists of connecting arms and an equal-armed lever which is pivotable about a fixed fulcrum. A common adjusting mechanism is further provided for varying the distance between the fixed fulcrums of the two equal-armed levers of the two two-transmission units and for producing equal and symmetrical changes of the transmission ratios of all four transmission units.

If, however, two or more two-transmission units are to be connected in series, the present invention further provides an adjusting mechanism whereby the distance between one normally fixed fulcrum of the linkage system of one two-transmission unit may be adjusted relative to the fixed fulcrum of the linkage system of another two-transmission unit, while each of the other fixed fulcrums of the linkage systems of each of the several two-transmission units is connected by means of a connecting rod to a fixed fulcrum of an adjacent two-transmission unit.

A further embodiment of the invention is applicable to cone-pulley drives in which each transmission unit shaft carries two conical disks which are axially slidable relative to each other and are adjustable in such a manner by means of control levers which are pivotable about fixed fulcrums that a reduction of the axial distance between the conical disks of the pulley on one transmission unit shaft is compensated by a corresponding enlargement of the axial distance between the beveled disks of the pulley on the other transmission unit shaft. For this purpose, an adjustment mechanism engages with the free ends of the control levers and permits the distance between these ends to be varied. The object of the present invention is then attained by pivotally connecting the end of one control lever of one transmission unit to the end of an adjacent control lever of an adjacent transmission unit by means of a connecting member, the effective length of which is adjustable. This feature of the invention is also not limited in its application to only two transmission units, but may also be applied to a connection of numerous such transmission units in series to each other, in which case the two adjacent control levers of each pair of adjacent transmission units are connected to each other by means of a connecting member. Only the two control levers of the transmission units at the beginning and at the end of the series are not connected to each other by a connecting member but are adjusted at their ends by means of the adjusting mechanism without any possibility of compensation.

Further objects, features, and advantages of the present invention will be apparent from the following detailed description thereof, particularly when read with reference to the accompanying drawings showing diagrammatic cross sections of several embodiments of the invention, in which—

Fig. 5 shows a device for limiting the movement of the compensating connecting rod by means of stops; while Fig. 6 shows a detail view for illustrating the operation of a torque-responsive contact pressure device according to the invention.

Figure 1:
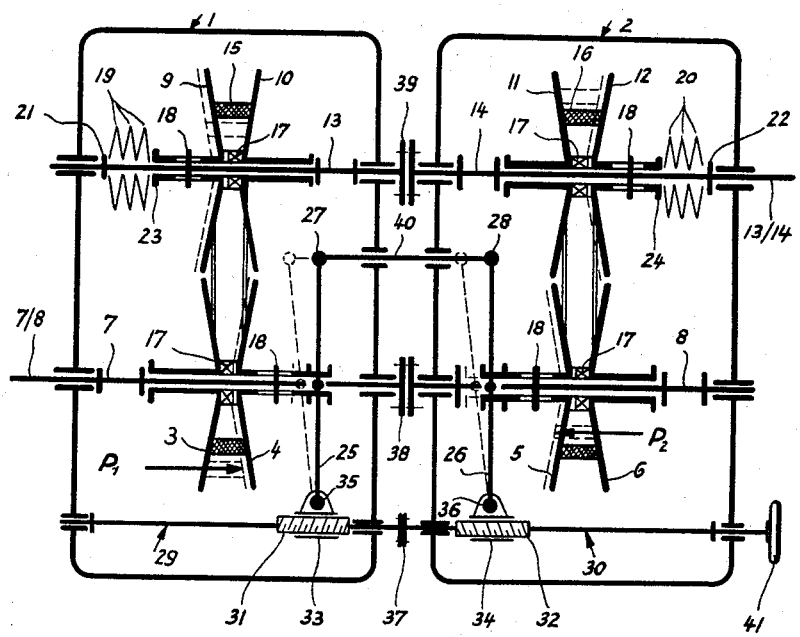
Fig. 1 shows a unit consisting of two interconnected cone-pulley drives, each of which is provided with a control lever.

Referring to the drawings, and first particularly to Fig. 1, the apparatus according to this first embodiment of the invention consists of two infinitely variable, cone-pulley driven belt transmission units 1 and 2 which are connected in parallel and each of which is provided with a control lever. Each transmission unit 1 and 2 has a drive shaft 7 or 8 and a driven shaft 13 or 14, respectively. Each of these shafts carries a cone pulley which consists of two conical disks which are axially slidable relative to each other. Thus, drive shaft 7 of gear 1 carries a pair of conical disks 3 and 4 and drive shaft 8 of gear 2 carries a pair of conical disks 5 and 6, while the driven shaft 13 of transmission unit 1 carries a pair of conical disks 9 and 10 and driven shaft 14 of transmission unit 2 carries a pair of conical disks 11 and 12. The pulleys formed of the pairs of disks 3 and 4 and 9, 10, respectively, are connected by an endless link belt 15 which is preferably metallic, such as a chain of any suitable construction, while the pulleys formed of the pairs of disks 5, 6 and 11, 12, respectively, are connected by a similar link belt 16. Disks 3 and 10 of transmission units 1 and disks 6 and 11 of transmission unit 2 are rigidly secured to their respective shafts, while the other disks of each pair, that is, disks 4 and 9 of transmission unit 1 and disks 5 and 12 of transmission unit 2 are mounted on their respective shafts so as to be slidable thereon in the axial direction relative to the respective fixed disks. The two disks of each pair are connected to each other by claw couplings 17 so as to be slidable but non-rotatable relative to each other. The axially slidable disks 4, 9, 5, and 12 and their respective shafts 7, 8, 13, and 14 are further provided with suitable means 18 which prevent any relative rotation between the respective shafts and disks but permit the latter to slide along these shafts in the axial direction. The driven shafts 13 and 14 also carry plate springs 19 and 20, respectively, which engage at one side with flanges 21 or 22 on shafts 13 or 14, respectively, and at the other side with flanges 23 or 24 on the hubs of conical disks 9 or 12, respectively, so that these disks will be pressed against link belts 15 and 16, while the latter, in turn, are pressed against the axially fixed disks 10 and 11, respectively. At the driving side of each transmission unit 1 and 2, however, the hubs of the axially slidable disks 4 and 5 are pivotably and to a certain extent slidably connected to control levers 25 and 26, respectively. These control levers 25 and 26 are pivotable by means of an adjusting mechanism 29 and 30 about fulcrums 27 and 28 which, for a better understanding, are first assumed to be mounted in a fixed position within the housings of the two transmission units. Such pivotal movement of control levers 25 and 26 as may be produced by an operation of the adjusting means 29 and 30 will move conical disks 4 and 5 in the axial direction. Adjusting means 29 and 30 consist of shafts on which screw-threaded spindles 31 and 32, respectively, are mounted which carry nuts 33 and 34, respectively, which are pivotally connected to the free ends of control levers 25 and 26 by fulcrums 35 and 36. When spindles 31 and 32 are rotated, nuts 33 and 34 will travel along these spindles and thereby take along the free ends of control levers 25 and 26, thus pivoting these levers about the fixed fulcrums 27 and 28.

In the two-transmission unit as illustrated in Fig. 1, the two transmission units 1 and 2 which are inversely symmetrical to each other are connected to each other by means of shaft couplings 37, 38, and 39. Coupling 37 rigidly connects the shafts of adjusting means 29 and 30, coupling 38 connects the two drive shafts 7 and 8, and coupling 39 connects the two driven shafts 13 and 14. The two fulcrums 27 and 28, which were assumed to be in a fixed position relative to the housing of each respective transmission unit are in fact disconnected from the transmission unit housings and pivotally connected to each other by means of a connecting rod 40. Levers 25 and 26 now form rocking levers which are pivotable about fulcrums 35 and 36, while levers 25 and 26 together with connecting rod 40 form a linkage system or swinging-block linkage.

Connecting rod 40 extends through the adjacent walls of gears 1 and 2 and is slidably guided thereby. The two shafts of the interconnected adjusting means 29 and 30 with spindles 31 and 32 thereon may be turned about their common axis by means of a handwheel 41 so as to set up and control the desired transmission ratio of transmission units 1 and 2. Control levers 25 and 26 are then pivoted about fulcrums 27 and 28 where connecting rod 40 is pivotally connected to these levers, and shift the axially movable disks 4 and 5 of both transmission units 1 and 2 so that the distance between them and the fixed disks 3 and 6 will change equally and to the same extent. On the other hand, the linkage system consisting of the two control levers 25 and 26 and connecting rod 40 may carry out a pivotal movement about points 35 and 36 which for such movement may be regarded as being fixed fulcrums. If this linkage system carries out such a pivotal movement about fixed fulcrums 35 and 36 toward the left, as indicated in dotted lines in Fig. 1, the axial distance between disks 3 and 4 of transmission unit 1 diminishes, while at the same time the axial distance between disks 5 and 6 of transmission unit 2 increases.

The common drive shaft 7, 8 of the interconnected gears is driven at a certain speed, for example, by means of an electric motor, not shown. This drive power should be equally distributed to both transmission units 1 and 2 and be fully transmitted by the common driven shaft 13, 14 thereof to a machine, not shown, after the driving speed has been adjusted as desired by these infinitely variable transmission units.

In describing the operation of the apparatus according to the invention, it may first be assumed that both transmission units 1 and 2 run at an identical transmission ratio which may be arbitrarily adjusted. Both transmission units are then subjected to an equal load and the axially movable disks 4 and 5 therefore exert equal but counteracting control forces which are compensated with each other by means of the connecting rod 40. If hand-wheel 41 is then turned so as to enlarge the distance between fulcrums 35 and 36, control levers 25 and 26 will pivot about fulcrums 27 and 28 which in this case are to be regarded as stationary and which are connected by connecting rod 40. Control levers 25 and 26 will then shift the axially slidable disks 4 and 5. The link belts 15 and 16 will then be forced to move radially outwardly between the pulleys formed by disks 3, 4 and 5, 6 while due to the lateral shifting movement of disks 9 and 12 caused by the action of plate springs 19 and 20, link belts 15 and 16 will at the same time move radially inwardly between the pulleys formed by disks 9, 10 and 11, 12. The transmission ratio will thus be changed symmetrically and equally in both transmission units so that the driven shaft 13, 14 will run faster than previously.

Let us now assume that for any possible reason the transmission ratios of the individual transmission units which have been arbitrarily set should change relative to each other, as indicated in Fig. 1 in dotted lines. If coupling 39 between shafts 13 and 14 were disconnected while drive shaft 7, 8 is driven at the same speed as previously, shaft 13 of transmission unit 1 would then run faster than shaft 14 of transmission unit 2. However, since shafts 13 and 14 are rigidly connected to each other, such common shaft 13, 14 can only have one speed, which means that the faster driving transmission unit 1 must drag along the slower driving transmission unit 2. Transmission unit 1 will thus be subjected to a much greater load than transmission unit 2. This, in turn, means that the forces $P_1$ exerted by the more highly loaded link belt 15 of transmission unit 1 upon the axially movable disk 4 will be considerably greater than the corresponding forces $P_2$ in transmission unit 2. Since the unequal forces $P_1$ and $P_2$ will be transmitted as control forces to control levers 25 and 26 and be compensated with each other by means of connecting rod 40, the equilibrium of forces will be unbalanced on the linkage system consisting of the two control levers 25 and 26 and connecting rod 40. This linkage 25, 40, 26 will therefore pivot about the fixed fulcrums 35 and 36 from the dotted-line position to the full-line position, and the transmission ratio of the two individual transmission units 1 and 2 will change inversely to each other until both transmission units will run at exactly the same ratio when the load will be equally distributed between both transmission units. Such equal load distribution will automatically occur after any unbalancing interference and it is independent of the transmission ratio of both transmission units which may be arbitrarily selected by means of the adjusting mechanism, and also independent of a change in load upon the transmission units caused by changes in the operation of the driven machine.

Figure 2:
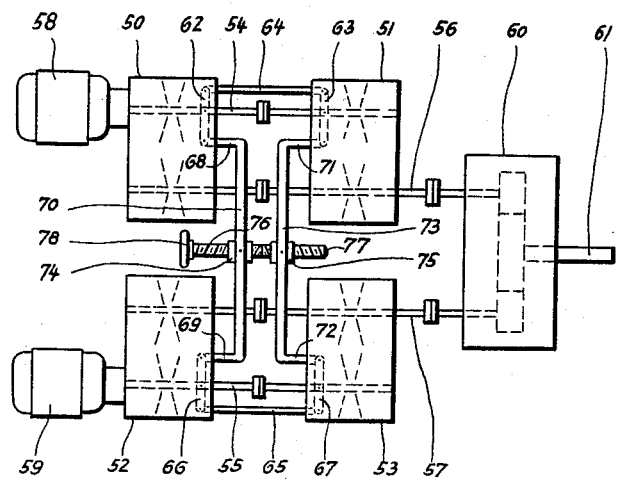
Fig. 2 shows two interconnected two-transmission units similar to the unit shown in Fig. 1, which are connected in parallel.

Fig. 2 illustrates two of such two transmission units as shown in Fig. 1 connected in parallel. Each two transmission units consists of two individual transmission units 50, 51 and 52, 53, respectively, the design and operation of which substantially correspond to those of the gears shown in Fig. 1. Each two-transmission unit is driven by a separate electric motor 58 and 59, respectively. Drive shafts 54 and 55, as well as the driven shafts 56 and 57, of both transmission units are rigidly connected to each other. The driven shafts 56 and 57 of both units are connected to each other by a common speed reduction gear 60 to drive a single shaft 61. In place of the two electric motors 58 and 59 at the driving side, it is also possible to provide a gear similar to gear 60 to connect drive shafts 54 and 55 of the two units, and then to drive such gear by means of a single motor.

Control levers 62 and 63 of transmission units 50 and 51 of the first unit are again interconnected by a connecting rod 64 so as to form a linkage system. Connecting rod 65 similarly interconnects control levers 66 and 67 of transmission units 52 and 53 of the second unit to form a linkage system. However, the adjusting mechanism for changing the transmission ratios in an equal direction does not engage directly at the free ends of the control levers of each unit as in the embodiment according to Fig. 1, but control levers 62 and 66 of transmission units 50 and 52 are connected to an equal-armed lever 70 by means of arms 68 and 69. Similarly, levers 63 and 67 of transmission units 51 and 53 are connected to another equal-armed lever 73 by means of arms 71 and 72. Levers 70 and 73 are pivotably mounted on nuts 74 and 75 which are adapted to travel along oppositely directed screw threads 76 and 77 on an adjusting spindle 78 which is mounted in a fixed position relative to the transmission unit housings. If spindle 78 is turned about its axis, the fulcrums of levers 70 and 73 on nuts 74 and 75 will be changed and an equal change of the transmission ratio of all four transmission units will thus be produced. On the other hand, the load of the transmission units within each unit will be equally distributed between the two transmission units 50 and 51 or 52 and 53, respectively, of each unit by a pivotal movement of linkages 62, 64, 63 and 66, 65, 67, respectively. Furthermore, the load will also be balanced between each transmission of one unit and each corresponding transmission of the other unit by means of the equal-armed levers 70 and 73 since these levers when pivoted about their fulcrums on nuts 74 and 75 also produce counteracting changes in the transmission ratios in the transmission units connected thereby. Therefore, transmission units 50 and 52 as well as transmission units 51 and 53 must run under a load which is equal in all of them. The total load will therefore be automatically reestablished after any unbalancing interference.

The present invention also permits several two-transmission units according to Fig. 1 to be connected in series. The control levers of each two-transmission unit may then be interconnected by a separate connecting rod to form linkage systems so that the load within each group will be equally distributed to the two transmission units of each unit in the manner as described with respect to Fig. 1. The control levers of the transmission units at the beginning and at the end of the transmission unit series may then be connected by pivotal joints to a common adjusting mechanism so that, when the latter is operated, the distance between these joints of the two outermost control levers will be changed. Each of these joints forms one of the normally fixed fulcrums about which the linkage systems of the two outer two-transmission units are pivotable. The second fixed fulcrum of each of these two two-transmission units is connected by a connecting arm to the fixed fulcrum of the adjacent two-transmission unit so that the various control levers, connecting rods, and connecting arms form a link chain, the total length of which may be varied by an operation of the adjusting mechanism.

Figure 3:
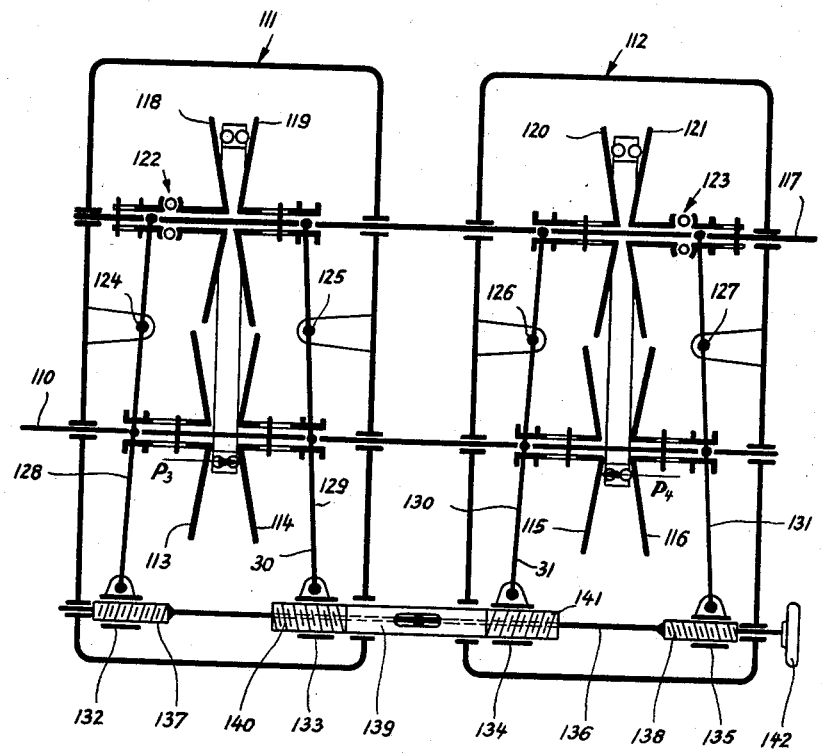
Fig. 3 shows a unit which likewise consists of two interconnected cone-pulley drives, each of which, however, is provided with two control levers.

Fig. 3 illustrates a modification of the two-transmission cone-pulley drive as shown in Fig. 1 which differs from the latter primarily by the design and arrangement of the control rods. A common drive shaft 110 of both transmission units carries within each transmission unit 111 and 112 a pulley consisting of a pair of conical disks 113, 114 and 115, 116, respectively. Both disks of each pair are axially slidable relative to each other along shaft 110 but are mounted on the latter so as to be nonrotatable relative thereto. The common driven shaft 117 of both transmission units also carries a pulley within each transmission unit consisting of a pair of conical disks 118, 119 and 120, 121, respectively. Both disks of each driven pulley are likewise axially slidable relative to each other along shaft 117. Disks 119 and 120 are nonrotatably secured directly to shaft 117, while disks 118 and 121 are nonrotatably but indirectly connected to shaft 117 by means of a torque-transmitting contact-pressure mechanism 122 and 123, respectively, which is adapted to generate axial forces which are proportional to the torque. For arbitrarily varying the transmission ratio of this two-transmission unit, each individual transmission unit is provided with two control levers 128, 129 and 130, 131, respectively, which are pivotable about fulcrums 124, 125, 126, and 127, respectively, which are disposed in a fixed position relative to the gear housings. The two control levers of each individual transmission unit are connected to the axially movable disks and to the pressure mechanism in such a manner that a movement of the control levers in opposite directions to each other produces an increase of the distance between the two conical disks of one pulley and at the same time an equally large reduction of the distance between the two disks of the other pulley. In order to produce such opposite pivotal movement of the two control levers of each individual transmission unit when the two transmission units are not interconnected, the free ends of the two levers are pivotally connected to nuts 132 and 133 or 134 and 135, respectively, the distance between which may be adjusted by means of a screw spindle with oppositely directed screw threads. If two individual transmission units of this type of design are interconnected, both gears 111 and 112 may be adjusted by a common screw spindle 136 which has oppositely directed screw threads 137 and 138 along which nuts 132 and 135 may travel in the axial direction, while nuts 133 and 134 on the ends of control levers 129 and 130 may travel along oppositely directed screw threads 140 and 141 on the two ends of a sleeve 139 which is mounted on spindle 136 so as to be longitudinally slidable thereon but nonrotatable relative thereto. Sleeve 139 extends through the adjacent lateral walls of both gears 111 and 112. If spindle 136 is turned by means of a handwheel 142, sleeve 139 will also be turned whereby the distance between nuts 132 and 133 and nuts 134 and 135 in both transmission units will be equally changed, the two control levers of each transmission unit will be pivoted in opposite directions about the fixed fulcrums 124, 125, 126, and 127, respectively, and the transmission ratios of both transmission units will also be changed equally. The threaded sleeve 139 which serves as a connecting member between the two transmission units then has an effective length, as measured by the distance between nuts 133 and 134 on control levers 129 and 130 of both transmission units 111 and 112, which changes inversely to the change in distance between nuts 132 and 133 and nuts 134 and 135, respectively, within each individual transmission unit. The control forces exerted by the individual transmission units upon their control levers 128 and 131 are then compensated with each other by means of the axially fixed spindle 136, while the control forces $P_3$ and $P_4$ of control levers 129 and 130 of the two transmission units are compensated with each other by means of the threaded sleeve 139 which is longitudinally slidable on spindle 136. If the loads of both transmission units and therefore also the control forces are of equal size, and there will thus be an equilibrium of forces, sleeve 139 will not shift axially in either direction on spindle 136. If, however, the two individual transmission units are subjected to different loads and if therefore the control forces $P_3$ and $P_4$ which act upon control levers 129 and 130 are of different size, sleeve 139 will shift in the axial direction whereby the transmission ratios of the two individual transmission units will be changed inversely to each other until both transmission units are individually subjected to equal loads and the equilibrium of forces on sleeve 139 will again be established.

The manner of connecting two transmission units as described above with respect to Fig. 3 may also be applied for interconnecting any other desired number of individual transmission units of this type of construction in a row, next to each other. In such a case, only the nuts of the outermost control levers are mounted directly on screw-threaded portions of the adjusting spindle with oppositely directed pitches (as shown in Fig. 3 by nuts 132 and 135), while the nuts on the adjacent control levers of adjacent transmission units are mounted on a threaded sleeve with oppositely directed screw threads which is longitudinally slidable along the adjusting spindle (similarly as shown in Fig. 3 by nuts 133 and 134 on control levers 129 and 130, respectively). If the adjusting spindle is turned, the transmission ratio of all transmission units will also in this case be equally changed, while the load will adjust itself uniformly and automatically in all transmission units since the threaded sleeves will shift in the axial direction when the equilibrium of forces is unbalanced, and will thus produce inversely directed changes of the transmission ratio of the transmission units which are interconnected by these sleeves.

Figure 4:
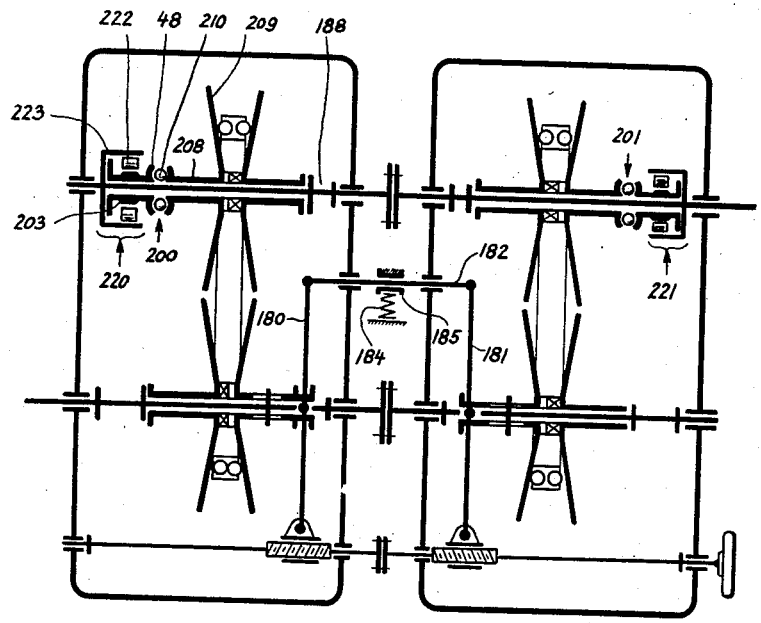
Fig. 4 shows a two-gear unit similar to that shown in Fig. 1, but provided with a torque-responsive pressure device for producing the proper contact pressure of the disks of the driven cone pulleys against the endless belt or chain, a friction brake for the compensating rods, and a torque overload release clutch in the form of an overrunning or freewheel clutch.
Figures 5, 6:
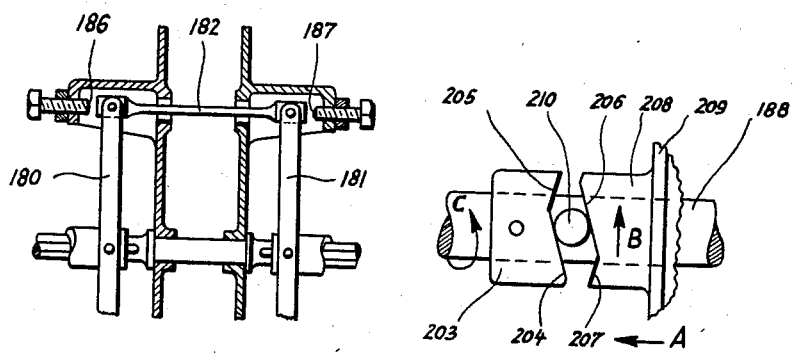

Fig. 4 illustrates a two-transmission unit similar to that shown in Fig. 1 which is provided with auxiliary means for preventing excessive loads upon one of the transmission units in the event of danger that, due to outer influences, for example, strong vibrations or jarring of the transmission unit foundation or erroneous adjustments carried out on the transmission units while standing still, the compensating connecting rod might be shifted out of its normal position which insures an equal load distribution between both transmission units. Fig. 5 illustrates partly in cross section another embodiment of such auxiliary device, while Fig. 6 illustrates the operation of the apparatus according to Fig. 4 and shows a pressure mechanism for transmitting the torque and for simultaneously producing a contact pressure in the axial direction which is proportional to the strength of the torque. These devices either individually or combined may also be applied to the embodiments of the invention as previously described.

As illustrated in Fig. 4, connecting rod 182 which interconnects the two control levers 180 and 181 is provided with a friction brake 185 which is acted upon by a spring 184. This friction brake 185 prevents connecting rod 182 from unintentionally moving in the lateral direction and thus also prevents any inverse change of the transmission ratio when the control forces are very small or when they disappear entirely, for example, at a time when the transmission units are at a standstill. Such displacement might occur if the transmission units are subjected to strong vibrations or jarring or if they are placed in an inclined position. Although when the transmission units are started such displacement would cause an excessive load upon one of the transmission units only for a very short time, such load would be very great. The friction brake is therefore made of such a strength that the difference between the strength of the control forces and the strength of the brake will be great enough to overcome the brake action of the latter.

Fig. 5 illustrates a modification of the means for preventing such undue lateral displacement of connecting rod 182 which consist of adjustable stops 186 and 187 which are rigidly mounted on parts of the gear housings and allow the ends of the connecting rod to move only to a limited extent.

In place of plate springs 19 and 20 as shown in Fig. 1, Fig. 4 further illustrates a torque-responsive pressure device 200 and 201, respectively, on the driven shaft 188 within each transmission unit. The operation of these devices will be described particularly with reference to Fig. 6. A sleeve 203 is rigidly secured to the driven shaft 188 and provided with at least two pairs of cam surfaces 204 and 205 extending in opposite directions along its annular end surface. Similar cam surfaces 206 and 207 are provided on the adjacent end surface of the hub 208 of the conical disk 209 which is freely rotatable and axially slidable on shaft 188. Balls or rollers 210 are interposed between the opposite cam surfaces 204 and 206 and are adapted to roll along these surfaces when they are turned relative to each other. If shaft 188 is rotated in the direction as shown by arrow C, the torque of the shaft will be transmitted through sleeve 203 and the balls or rollers 210 to hub 208 of disk 209 so that the latter will thereby also be rotated. However, at the same time an axial force will also be produced which is directed toward the conical disk 209 and of a size in accordance with the degree of inclination of the cam surfaces and proportional to the torque. This force produces an axial movement of disk 209 toward the other disk of the respective pulley until it engages with the link belt within such pulley. Shaft 188 has then turned together with sleeve 203 relative to hub 208 of the respective conical disk 209, and the balls or rollers 210 have then climbed up on cams 204 and 206. If the transmission ratio of the transmission units then changes and the link belt enters more deeply between the two disks of the respective pulley, disk 209 will be shifted in the axial direction along shaft 188, as shown by arrow A. This, however, requires that the conical disk 209 will rotate relative to shaft 188 in the direction as shown by arrow B so that the balls or rollers 210 will roll downwardly along cam surfaces 104 and 206. If, however, the link belt between the conical disks of the respective pulley moves outwardly to a larger radius, disk 209 will move in the direction opposite to that shown by arrow A and will at the same time rotate relative to shaft 188 in the direction opposite to that shown by arrow B so that the balls or rollers 210 will then roll uphill along cam surfaces 204 and 206. Cam surfaces 205 and 207 are provided for the opposite torque direction.

Each contact pressure device 200 and 201 as shown in Fig. 4 is combined with a torque overload release clutch 220 and 221, respectively, which is designed in the form of an overrunning or freewheel clutch and permits a transmission of the torque only for one of the two possible torque directions. In this case, sleeve 203 is not rigidly secured to shaft 188 but is freely rotatable thereon but not slidable in the axial direction. It is designed in the form of the inner part of an overrunning or freewheel clutch which cooperates in the usual manner through rollers 222 with an outer part 223 which is nonrotatably mounted on shaft 188. The overrunning clutch is designed so as to be able to transmit the torque from the respective conical disk through sleeve 203 to shaft 188 but not vice versa. If the transmission ratios of the two transmission units should differ from each other at the time when the operation of the two-transmission unit is started, for example, because due to strong jarring or an incorrect adjustment of the control and compensating rods, connecting rod 182 might have shifted laterally from its normal central position, the faster driving transmission unit cannot drag along the more slowly driving transmission unit since the overrunning clutch thereof prevents a torque transmission from the driven shaft to the respective pair of conical disks. Therefore, there can be no counteracting loads and thus no reactive power of an uncontrollable strength within the two-transmission unit. The maximum load which the faster driving gear alone might ever have to transmit would therefore be the total load of both transmission units, and that only until the load will again be equally distributed between both transmission units by the control and compensating rods as previously described. Such overrunning clutches may also be applied without any difficulty to the other embodiments of the invention as previously described.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination, at least two infinitely variable transmission units of similar construction, wherein each unit has a drive shaft and a driven shaft, means for positively connecting said drive shafts and said driven shafts, respectively, of both units to each other so that said corresponding shafts of both units when driven must run at equal speeds, means operatively connected to the units for simultaneously varying the ratios thereof in the same manner, and means operatively connecting said ratio varying means and responsive to differences in the loads transmitted by the units to vary the ratios of the units in opposite directions, whereby to equalize the loads transmitted by the units.

2. In combination, at least two infinitely variable transmission units of similar construction, wherein each unit has a drive shaft and a driven shaft, means for positively connecting said drive shafts and said driven shafts, respectively, of both units to each other so that said corresponding shafts of both units when driven must run at equal speeds, individual means one operatively connected to each unit for varying the transmission ratios thereof, means operatively connected to the ratio varying means of both units for simultaneously adjusting the units in the same manner, each said ratio varying means being movable in response to variations in the load transmitted by the unit to which it is connected, and means connecting the ratio varying means of both units for transmitting movement of one to the other to adjust the units in opposite manners, whereby variation between the loads transmitted by the two units moves the ratio varying means of both units in a direction to equalize the loads transmitted.

3. In combination, at least two infinitely variable transmission units of similar construction, wherein each unit has a drive shaft and a driven shaft, means for connecting said drive shafts and said driven shafts, respectively, of both units to each other so that said corresponding shafts of both units are adapted to run at equal speeds, a cone pulley mounted on each shaft, each pulley comprising a conical disc mounted on said shaft in an axially fixed position and a conical disc mounted on said shaft so as to be nonrotatable relative thereto but to be axially slidable thereon relative to said axially fixed disc, and endless power transmitting means within each unit connecting said drive pulley with said driven pulley; means for pressing said slidable disc on said driven shaft of each unit into engagement with said power transmitting means and the transmitting means into engagement with said fixed disc on said driven shaft, a control lever in each unit connected to the slidable disc on the drive shaft for shifting such disc relative to and into engagement with said power transmitting means and the transmitting means into engagement with said fixed disc on said drive shaft, movable means connecting points of the control levers of both units to each other to maintain a constant distance between such points, means pivotably mounting other points of each of said control levers about normally stationary fulcrums, and common adjusting means connected to the levers of both units for adjusting the distance of said normally stationary fulcrums relative to each other so that, when said distance between said stationary fulcrums is changed, the transmission ratios are changed equally and symmetrically in both units, while, when the power transmitted by the combined units is unequally distributed between the two units, the forces then acting upon each control lever will be unequal and, because said forces counteract each other through the action of said movable lever connecting means, the difference between said forces causes said movable lever connecting means to be displaced from its normal position, thereby causing the transmission ratios of both units to be changed inversely to each other which, in turn, will equalize the load distributed between the two units.

4. In combination, at least two infinitely variable transmission units of similar construction, wherein each unit has a drive shaft and a driven shaft, means for connecting said drive shafts and said driven shafts, respectively, of both units to each other so that said corresponding shafts of both gears are adapted to run at equal speeds, a cone pulley mounted on each shaft, each pulley comprising two conical discs axially slidable on said shaft relative to each other, and endless power transmitting means within each unit connecting said drive pulley with said driven pulley; a pair of control levers in each unit, means pivotally mounting each of said control levers about a fixed fulcrum at a point intermediate said driving pulley and said driven pulley of each unit, said control levers being arranged to act upon said discs of each pulley so that when said levers reduce the axial distance between the discs on one shaft of one unit they correspondingly increase the axial distance between the discs on the other shaft of the same unit, each of said control levers having a free end, common adjusting means connected to said free ends of one of the control levers of both units for varying the distance between the control levers of each unit, a connecting member slidable in the axial direction and pivotally connected to the free ends of one control lever of each unit, and means for changing the effective length of said connecting member so that when said adjusting means are operated, they will change the transmission ratios of said two units inversely to each other, said adjusting means being further adapted to adjust the distance between the free ends of the two control levers of said units inversely to the simultaneous adjustment of the free ends of the control levers within each unit, whereby when the forces acting upon the adjusting means in both units are equal to each other, these forces will be balanced with each other by said connecting member, while when said forces are unequal to each other, said connecting member will be axially displaced, thereby causing a change of the transmission ratios of both units inversely to each other which, in turn, will equalize the load distributed between the two units.

5. An apparatus as defined in claim 4, wherein said adjusting means comprise a screw-threaded spindle having portions with right-hand and left-hand threads thereon, respectively, and nut members on said portions, said lever free ends being pivoted to said nut members, said nut members being adapted to travel on said spindle in opposite directions to each other for varying the distance between said pivots.

6. An apparatus as defined in claim 3, further comprising adjustable means for limiting the extent of the movements of said movable lever connecting means.

7. An apparatus as defined in claim 3, further comprising a friction brake engaging said movable lever connecting means for preventing undesired movements thereof.

8. An apparatus as defined in claim 4, further comprising means on each of said driven shafts of said units for transmitting a torque to said shaft in only one direction.

9. In combination, at least two infinitely variable transmission units of similar construction, wherein each unit has a drive shaft and a driven shaft, means for connecting said drive shafts and said driven shafts, respectively, of both units to each other so that said corresponding shafts of both units are adapted to run at equal speeds, a cone pulley mounted on each shaft, each pulley comprising a conical disc mounted on said shaft in an axially fixed position and a conical disc mounted on said shaft so as to be nonrotatable relative thereto but to be axially slidable thereon relative to said axially fixed disc, and endless power transmitting means within each unit connecting said drive pulley with said driven pulley, means for pressing said slidable disc on said driven shaft of each unit into engagement with said power transmitting means and the transmitting means into engagement with said fixed disc on said driven shaft, a control lever in each unit connected to the slidable disc on the drive shaft for shifting such disc relative to and into engagement with said power transmitting means and the transmitting means into engagement with said fixed disc on said drive shaft, a connecting rod pivotably connecting points of the control levers of both units to each other to maintain a constant distance between such points, such two units constituting a set, a second similar set, connecting levers each having a pivot thereon for other points of one of the control levers of each set, said pivots constituting first normally stationary fulcrums, means for pivotably mounting each of said connecting levers at its center about a second normally stationary fulcrum, and means adjustably connecting said second fulcrums, said last means simultaneously adjusting the distance between the first stationary fulcrums of each set, so that, when said distance between said first stationary fulcrums is changed, the transmission ratios are changed equally and symmetrically in both units of the set, while, when the power transmitted by the combined units is unequally distributed between the two units, the forces then acting upon each control lever will be unequal and, because said forces counteract each other through the action of said connecting rod, the difference between said forces causes said connecting rod to be displaced from its normal position, thereby causing the transmission ratios of both units to be changed inversely to each other which, in turn, will equalize the load distributed between the two units of the set and whereby the transmission ratio of all four units may be changed equally to each other.

References Cited in the file of this patent
UNITED STATES PATENTS

| | | |
|---|---|---|
| 785,917 | Reeves | Mar. 28, 1905 |
| 1,727,232 | Farrell | Sept. 3, 1929 |